No. 672,533. Patented Apr. 23, 1901.
H. D. LEFEBVRE.
WHEEL TIRE AND RIM.
(Application filed Nov. 12, 1900.)
(No Model.)
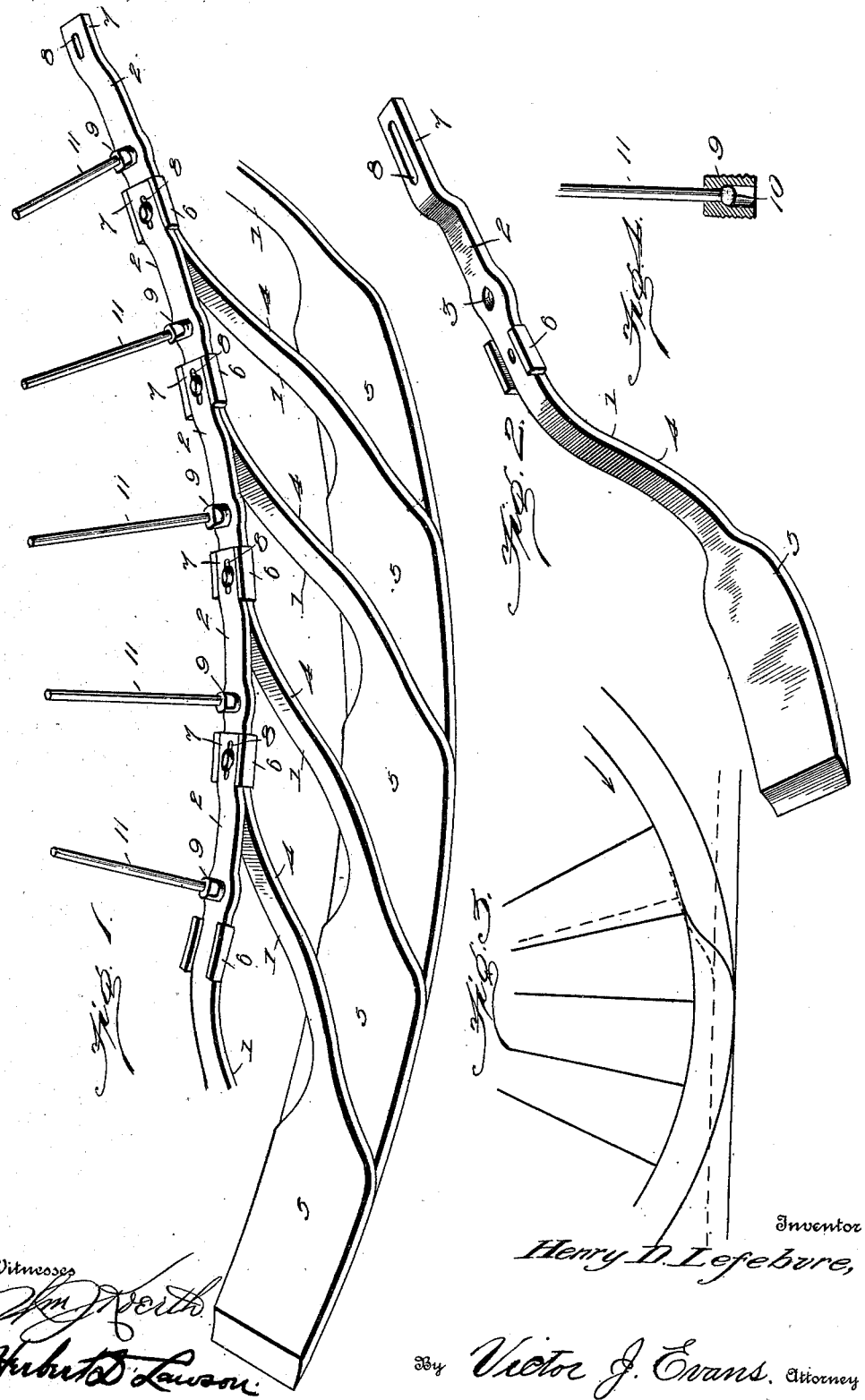
Witnesses
Inventor
Henry D. Lefebvre,
By Victor J. Evans, Attorney

UNITED STATES PATENT OFFICE.

HENRY D. LEFEBVRE, OF ALPENA, MICHIGAN.

WHEEL TIRE AND RIM.

SPECIFICATION forming part of Letters Patent No. 672,533, dated April 23, 1901.

Application filed November 12, 1900. Serial No. 36,246. (No model.)

*To all whom it may concern:*

Be it known that I, HENRY D. LEFEBVRE, a citizen of the United States, residing at Alpena, in the county of Alpena and State of Michigan, have invented new and useful Improvements in Wheel Tires and Rims, of which the following is a specification.

This invention relates to new and useful improvements in tires for vehicle-wheels;
and its primary object is to provide a metallic tire which is formed of similar spring-metal sections so constructed as to produce a light smooth-running wheel having a resilient tread and which permits of greater speed than the ordinary rubber tire.

To this end the invention consists in the novel construction and combination of parts hereinafter more fully described and claimed, and illustrated in the accompanying drawings, showing the preferred form of my invention, and in which—

Figure 1 is a perspective view of a portion of a wheel with the tire secured thereto. Fig. 2 is a detailed view of one of the sections of the tire. Fig. 3 is a diagrammatical view illustrating the advantages of the invention over an ordinary rubber tire, and Fig. 4 is a detailed view of the means for securing a spoke to the wheel.

Referring to the drawings by numerals of reference, 1 is one of the sections of the combined rim and tread of the wheel, said section comprising a straight portion 2, having a threaded aperture 3 therein and downwardly and forwardly curved portions 4 and 5, respectively. Ears 6 are arranged at opposite sides of the straight portion 2, and the end 7 of said portion is preferably bent upward, as shown in Fig. 2, and provided with an aperture 8.
The various sections 1 are secured together by placing the free ends thereof between the ears 6 of the adjacent members and riveting or bolting them together. The flattened ends 5 of the spring members will then lie in the position shown in Fig. 1, thereby forming a resilient tread. A threaded cylindrical stud 9 is placed within each of the apertures 3, and each stud contains a ball 10, formed at one end of a spoke 11. The upper end of the stud is flattened, as at 12, so as to permit the stud to be readily turned for tightening the spoke. By this construction it will be seen that any one of the parts 1 may be readily removed or replaced in the event of breakage.

By employing a device of this character a wheel is obtained which is faster than those employing the ordinary resilient tire. When a weight is placed upon the latter, the diameter of the wheel becomes smaller, whereas with my construction, as shown in Fig. 3, when the spring-tread is depressed the wheel will be forced forward, and thereby compensate for any loss in the diameter of the wheel.

In the foregoing description I have shown the preferred form of my invention; but I do not limit myself thereto, as I am aware that modifications may be made therein without departing from the spirit or sacrificing any of the advantages thereof, and I therefore reserve the right to make all such changes as fairly fall within the scope of my invention.

Having thus fully described my invention, what I claim as new, and desire to secure by Letters Patent, is—

1. A wheel comprising similar spring-metal members, secured together at their inner ends forming a rim, and free at their outer edges and forming a tread, and a spoke secured to each member.

2. A wheel comprising similar members each having ears at opposite edges, adjacent to its inner end, the inner ends of said members being secured between the ears of the adjacent members and forming a rim, and the outer free ends thereof forming a tread, and a spoke secured to each member.

3. A wheel comprising similar members each having ears at opposite edges, adjacent to its inner end, the inner ends of said members being secured between the ears of the adjacent members and forming a rim, and the outer free ends thereof forming a tread, a threaded stud engaging each of the members, a flattened end to the stud, a ball revoluble within the stud, and a spoke to said ball.

4. As a new article of manufacture, a metallic-tire section formed in one piece and comprising a flattened end, an intermediate curved portion, a straight perforated end portion, and ears formed at opposite sides thereof.

In testimony whereof I affix my signature in presence of two witnesses.

HENRY D. LEFEBVRE.

Witnesses:
JEROME A. ST. ONGE,
WILLIE FRUDELL.